US009334189B2

(12) United States Patent
Axtell, III et al.

(10) Patent No.: US 9,334,189 B2
(45) Date of Patent: May 10, 2016

(54) COPPER RED FRITS AND PIGMENTS COMPRISING SILICA AND AT LEAST ONE OF CUPRIC OXIDE AND CUPROUS OXIDE

(71) Applicants: Enos A. Axtell, III, Seven Hills, OH (US); George E. Sakoske, Independence, OH (US); Andreas Schulz, Karben (DE); Juergen Hanich, Königstein (DE); Lothar Heck, Dreieich (DE); Dietrich Speer, Langenselbold (DE); Martin Baumann, Frankfurt (DE)

(72) Inventors: Enos A. Axtell, III, Seven Hills, OH (US); George E. Sakoske, Independence, OH (US); Andreas Schulz, Karben (DE); Juergen Hanich, Königstein (DE); Lothar Heck, Dreieich (DE); Dietrich Speer, Langenselbold (DE); Martin Baumann, Frankfurt (DE)

(73) Assignee: Ferro Corporation, Mayfield Heights, OH (US)

( * ) Notice: Subject to any disclaimer, the term of this patent is extended or adjusted under 35 U.S.C. 154(b) by 0 days.

(21) Appl. No.: 14/535,516

(22) Filed: Nov. 7, 2014

(65) Prior Publication Data
US 2015/0068249 A1 Mar. 12, 2015

Related U.S. Application Data

(62) Division of application No. 13/377,183, filed as application No. PCT/US2010/038743 on Jun. 16, 2010, now Pat. No. 8,946,102.

(60) Provisional application No. 61/218,645, filed on Jun. 19, 2009.

(51) Int. Cl.
*C03C 8/02* (2006.01)
*C03C 3/078* (2006.01)
*C03C 3/085* (2006.01)
*C03C 3/089* (2006.01)
*C03C 3/091* (2006.01)
*C03C 3/095* (2006.01)
*C03C 4/02* (2006.01)
*C03C 8/18* (2006.01)
*C03C 17/04* (2006.01)
*C03C 21/00* (2006.01)
*C04B 41/00* (2006.01)
*C04B 41/50* (2006.01)
*C04B 41/86* (2006.01)
*C23C 24/10* (2006.01)
*C03B 19/10* (2006.01)
*C04B 111/82* (2006.01)

(52) U.S. Cl.
CPC .............. *C03C 8/02* (2013.01); *C03B 19/1095* (2013.01); *C03C 3/091* (2013.01); *C03C 4/02* (2013.01); *C03C 8/18* (2013.01); *C03C 17/04* (2013.01); *C03C 21/008* (2013.01); *C04B 41/009* (2013.01); *C04B 41/5022* (2013.01); *C04B 41/86* (2013.01); *C23C 24/10* (2013.01); *C03B 2201/40* (2013.01); *C03C 2205/00* (2013.01); *C04B 2111/82* (2013.01); *Y10T 428/2982* (2015.01)

(58) Field of Classification Search
CPC ........ C03C 3/078; C03C 3/085; C03C 3/087; C03C 3/089; C03C 3/091; C03C 3/095; C03C 8/02
USPC .................. 501/14, 21, 55, 65, 66, 69, 70, 72
See application file for complete search history.

(56) References Cited

U.S. PATENT DOCUMENTS

| | | | |
|---|---|---|---|
| 3,466,160 A | 9/1969 | Keefer | |
| 3,779,734 A * | 12/1973 | Simonfi et al. | ............... 65/134.3 |
| 3,779,781 A | 12/1973 | Baak et al. | |
| 4,446,241 A | 5/1984 | Francel et al. | |
| 4,626,071 A * | 12/1986 | Wada et al. | .................... 359/885 |
| 4,892,847 A | 1/1990 | Reinherz | |
| 6,100,209 A | 8/2000 | Bentem et al. | |
| 6,387,510 B1 | 5/2002 | Nakashima et al. | |
| 6,878,464 B2 | 4/2005 | Moriya et al. | |
| 8,946,102 B2 | 2/2015 | Axtell, III et al. | |
| 2004/0018932 A1 | 1/2004 | Yuriditsky et al. | |
| 2005/0150412 A1* | 7/2005 | Geddes et al. | ................ 101/491 |
| 2006/0033440 A1* | 2/2006 | Steinmann | ................ C03C 4/02 313/636 |
| 2007/0021288 A1 | 1/2007 | Lefevre et al. | |
| 2008/0090034 A1 | 4/2008 | Harrison et al. | |
| 2010/0101275 A1 | 4/2010 | Abensour et al. | |
| 2012/0196126 A1* | 8/2012 | Axtell, III | ............... C03C 3/091 428/402 |
| 2012/0212962 A1* | 8/2012 | Yasumori | ................ C03C 3/089 362/260 |
| 2013/0136909 A1* | 5/2013 | Mauro | ....................... C03C 4/02 428/220 |

FOREIGN PATENT DOCUMENTS

DE 102008052339 A1 4/2010
JP 2004-143003 A 5/2004

OTHER PUBLICATIONS

English abstract for DE 102008052339 published Apr. 22, 2010, one page.
English abstract for JP 2004-143003 published May 20, 2004, one page.
International Search Report for corresponding PCT /US2010/ 038743 mailed Aug. 13, 2010, three pages.

* cited by examiner

*Primary Examiner* — Holly Le
(74) *Attorney, Agent, or Firm* — Rankin, Hill & Clark LLP

(57) ABSTRACT

This invention relates to lead free and cadmium free copper-containing glass frits that can be used as pigments to color other glass frits or to impart color to solid substrates such as glass, ceramic or metals, or to impart color to a thermoplastic mass. The compositions comprise silica, alkali metal oxides, alkaline earth metal oxides, tin oxide and copper oxide. The resulting compositions can be used to decorate and protect automotive, beverage, architectural, pharmaceutical and other glass substrates, generally imparting a red color.

7 Claims, No Drawings

COPPER RED FRITS AND PIGMENTS COMPRISING SILICA AND AT LEAST ONE OF CUPRIC OXIDE AND CUPROUS OXIDE

BACKGROUND OF THE INVENTION

1. Field of Invention

This invention relates to low-firing, high durability glass and enamel compositions. In particular, the invention relates to glass frit compositions, and the glasses, ceramics and enamels made therefrom, which include $SiO_2$, alkali metal oxides, alkaline earth metal oxides, tin oxide and copper oxide. The compositions possess a red color achievable without the use of cadmium, lead, or chromium. The compositions may be used to form red-colored articles or as pigments on substrates such as glass, enamels, metals, and even as colorants in thermoplastics.

2. Description of Related Art

Coloration of glasses, enamels, metals and plastics with a red color has presented an especially difficult challenge for skilled practitioners. Traditionally, one or more of the oxides of iron or lead or chromium or sulfides of cadmium have been used to impart a red color to such substrates. For example, iron oxide, $Fe_2O_3$, lead oxide $Pb_2O_3$, and cadmium selenium sulfide ((Cd, Se)S), and such as molybdenum chromium red, or pigment red 104. However, iron oxides often have unwanted side effects, and heavy metals such as lead, chromium (especially hexavalent chromium), cadmium and selenium have come under increasing scrutiny from environmental agencies.

Further, most of the aforementioned red-tone pigments impart a relatively brownish color that often overwhelms the true red color often desired. There has been a dearth of truly deep vivid reds in the glass and enamels industry as well as in the thermoplastic industry.

Accordingly, and in particular, the goal of this work is to stain reduced-tin frits with copper to produce red pigments. Since cadmium is considered to be a heavy metal, replacing cadmium-containing pigments with cadmium-free pigments has long been an objective of the glass industry.

BRIEF SUMMARY OF THE INVENTION

The invention relates to a range of low firing, high durability glasses, glass frits, and glass enamel compositions that impart a red color to glass panels, enamel coatings, plastics, and other substrates. The invention describes the use of a red copper ruby glass as a pigment for the decoration of glass, metal, ceramic, glass ceramic and tiles by screen printing, spraying or digital printing. A distinguishing feature of the invention is the avoidance of cadmium (and lead) in pigments and to make cadmium free red. A red copper glass is used as a pigment. The pigments are made by melting and annealing a glass that contains tin and copper. Particles or clusters of metallic copper are formed in a redox reaction between copper ions and tin ions:

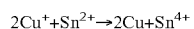

$$2Cu^+ + Sn^{2+} \rightarrow 2Cu + Sn^{4+}$$

The copper ions are reduced by tin ions in an annealing step.

The pigment alone or in combination with a glass frit is used as a decoration color, and may be applied to a substrate by e.g., printing, brushing, dipping, rolling, or spraying. A substrate decorated with the pigment is then fired to fuse the pigment to the substrate, thereby permanently affixing the color thereto.

Using the pigments, glass frits and methods of the invention, it is possible to obtain a red color on glass, metal, or ceramic substrates, using a cadmium-free formulation. Screen printing, spraying, or thermoplastic printing can be used to apply the pigment. Indirect printing procedures involving decals are also envisioned. The pigments herein can also be used to directly color plastics. Where appropriate, a single firing cycle can be used to impart a red color to substrates such as glass, metals, and ceramics. Certain embodiments involve separate firing and annealing steps, or more than one firing step.

Also it is possible to use also the unannealed frit as a forehearth colorant. In this case the frit is added to a mass of molten glass in the feeder channel. Glass objects, especially bottles, flasks or tumblers; are then formed, and the objects are subjected to heat treatment so that they develop a red color.

The invention also includes methods of making the various red glass fits and pigments disclosed herein, either (a) smelting a red frit or (b) annealing a previously fired reducing frit with a copper compound (e.g., copper sulfate, copper nitrate, etc.), that provides copper ions, which exchange with those in the reducing frit. In (b), the copper compound may be combined with the reducing glass before the reducing glass is fritted as well.

In particular, the invention provides a fired enamel composition that is free of lead, cadmium, bismuth, iron, selenium, arsenic, tantalum and sulfides, the composition comprising a solids portion comprising a frit portion, wherein the frit portion comprises, prior to firing: (a) 50-75 wt % $SiO_2$, (b) 4-22 wt % $R_2O$, wherein R is at least one of Na and K, (c) 2-30 wt % R'O wherein R' is at least one of Mg, Ca, Sr and Ba (d) 0.5-20 wt % $B_2O_3$, (e) 0-15 wt % $Al_2O_3$, (f) 1-15 wt % SnO, and (g) 1-10 wt % $Cu_2O$. When applied to and fired on a suitable substrate such as glass, enamel or metal, the inventive frit imparts a red color thereto.

In another embodiment, the invention relates to a fired enamel composition that is free of intentionally added lead, cadmium, bismuth, iron, selenium, arsenic, tantalum, chromium and sulfides, the composition comprising a solids portion comprising a fit portion, wherein the frit portion comprises, prior to firing: (a) 55-75 wt % $SiO_2$, (b) 8-22 wt % $R_2O$, wherein R is at least one of Na and K (c) 2-10 wt % CaO, (d) 1-5 wt % MgO, (e) 0.1-3 wt % $Al_2O_3$, (f) 1-15 wt % SnO, and (g) 0.05-1 wt % $SO_3$.

In another embodiment, the invention relates to an enamel composition that is free of intentionally added: lead, cadmium, bismuth, iron, selenium, arsenic, tantalum, chromium and sulfides, the composition comprising a solids portion comprising a fit portion, wherein the fit portion comprises, prior to firing (a) 60-75 wt % $SiO_2$, (b) 8-20 wt % $Na_2O$, (c) 8-20 wt % $K_2O$, (d) 1-15 wt % SnO, 5-15 wt % CaO, and 1-5 wt % $Cu_2O$.

Yet another embodiment of the invention involves a method of decorating a glass substrate comprising: (a) applying to a glass substrate, ceramic substrate or metal substrate an enamel composition that is free of intentionally added: lead, cadmium, bismuth, iron, selenium, arsenic, tantalum, chromium and sulfides, the composition comprising a solids portion, wherein the solids portion comprises a frit portion, wherein the frit portion comprises, prior to firing: (i) 50-75 wt % $SiO_2$, (ii) 4-22 wt % $R_2O$, wherein R is at least one of Na and K, (iii) 3-15 wt % CaO, (iv) 0-15 wt % MgO, (v) 0.5-20 wt % $B_2O_3$, (vi) 0-15 wt % $Al_2O_3$, (vii) 1-15 wt % SnO, and (viii) 1-10 wt % $Cu_2O$, and (b) firing the substrate and enamel composition at a temperature sufficient to flow the enamel composition to cause the enamel composition to at least partially adhere to the glass substrate.

Yet another embodiment of the invention involves a method of decorating a glass substrate comprising: (a) applying to a glass substrate an enamel composition that is free of intentionally added: lead, cadmium, bismuth, iron, selenium, arsenic, tantalum, chromium and sulfides, the composition comprising a solids portion, wherein the solids portion comprises a frit portion, wherein the frit portion comprises, prior to firing: (i) 60-75 wt % $SiO_2$, (ii) 8-20 wt % $Na_2O$, (iii) 8-20 wt % $K_2O$, (iv) 1-15 wt % SnO, (v) 5-15 wt % CaO, and (vi) 1-5 wt % $Cu_2O$, and (b) firing the substrate and enamel composition at a temperature sufficient to flow the enamel composition to cause the enamel composition to at least partially adhere to the glass substrate.

Still another embodiment of the invention is a method of decorating a glass substrate comprising: (a) applying to a glass substrate an enamel composition that is free of intentionally added: lead, cadmium, bismuth, iron, selenium, arsenic, tantalum, chromium and sulfides, the composition comprising a solids portion, wherein the solids portion comprises a frit portion, wherein the frit portion comprises, prior to firing: (i) 55-75 wt % $SiO_2$, (ii) 8-22 wt % $R_2O$, wherein R is at least one of Na and K, (iii) 2-10 wt % CaO, (iv) 1-5 wt % MgO, (v) 0.1-3 wt % $Al_2O_3$, (vi) 1-15 wt % SnO, and (vii) 0.05-1 wt % $SO_3$, (b) firing the substrate and enamel composition at a temperature sufficient to flow the enamel composition to cause the enamel composition to at least partially adhere to the glass substrate, (c) applying to the fired enamel composition a blend of copper sulfate and sodium sulfate, and (d) firing and annealing the blend of copper sulfate and sodium sulfate to effect copper ion exchange with sodium ions in the enamel composition to impart a red color thereto.

Yet another embodiment of the invention is a particulate red pigment composition including a glass frit and copper particles or copper clusters.

Another embodiment of the invention is a particulate red pigment composition including a glass frit including copper ions and tin ions.

Still another embodiment of the invention is a method of decorating a substrate comprising: (a) applying to the substrate a coating of an enamel composition that is free of intentionally added: lead, cadmium, bismuth, iron, selenium, arsenic, tantalum, chromium and sulfides, the composition comprising a solids portion, wherein the solids portion comprises a frit portion comprising, prior to firing: (i) 60-75 wt % $SiO_2$, (ii) 8-25 wt % ($Li_2O+Na_2O+K_2O$), (iii) 1-15 wt % SnO, (iv) 5-15 wt % CaO, (v) 1-15 wt % MgO (vi) 0.1-2 wt % $Fe_2O_3$, 0.1-2 wt % $Cu_2O$ and 0.05-1 wt % $SO_3$, and (b) firing the substrate and coating at a temperature sufficient to flow the enamel composition to cause the enamel composition to adhere to the substrate.

In general, embodiments of the invention relate to methods of decorating a substrate with a red color comprising applying any enamel or pigment composition disclosed herein to the substrate and firing the substrate.

Still another embodiment of the invention is a method of decorating a thermoplastic comprising (a) forming a red-colored enamel composition enamel composition that is free of intentionally added: lead, cadmium, bismuth, iron, selenium, arsenic, tantalum, chromium and sulfides, the composition comprising a solids portion comprising a fit portion, wherein the frit portion comprises, prior to firing: (i) 50-75 wt % $SiO_2$, (ii) 8-25 wt % $R_2O$, wherein R is at least one of Li, Na and K, (iii) 2-30 wt % R'O, wherein R' is at least one of Mg, Ca, Sr and Ba, (iv) 0.1-10 wt % of at least one of $Cu_2O$ and CuO, and (v) 0.1-5 wt % $SO_3$, and (b) blending the enamel composition with a thermoplastic mass to form a red-colored thermoplastic mass.

Still another embodiment of the invention is a mass of molten glass that is free of intentionally added lead, cadmium, bismuth, iron, selenium, arsenic, tantalum, chromium and sulfides, the molten glass comprising: (a) 50-75 wt % $SiO_2$, (b) 4-22 wt % $R_2O$, wherein R is at least one of Na and K, (c) 2-30 wt % R'O, wherein R' is at least one of Mg, Ca, Sr and Ba, (d) 0.5-20 wt % $B_2O_3$, (e) 1-15 wt % SnO, and (f) 1-10 wt % of at least one of $Cu_2O$ and CuO, wherein a partial pressure of oxygen in the molten mass of less than $10^{-9}$ atmospheres. The above molten glass frit could be used as a feeder frit to stain a mass of molten base glass with a partial pressure of oxygen greater than $10^{-4}$ to less than $10^{-1}$ atmospheres.

A method of manufacturing red glass comprising adding a coloring fit, to a mass of molten colorless glass in a feeder channel, forming glass objects from the molten mass of glass, then subjecting the glass objects to heat treatment so that they develop a red color. This method preferably involves a frit that is free of lead, cadmium, bismuth, iron, selenium, arsenic, tantalum, chromium and sulfides, and wherein the composition comprises, prior to melting: (i) 50-75 wt % $SiO_2$, (ii) 4-22 wt % $R_2O$, wherein R is at least one of Na and K, (iii) 2-30 wt % R'O, wherein R' is at least one of Mg, Ca, Sr and Ba, (iv) 0.5-20 wt % $B_2O_3$, (v) 1-15 wt % SnO, and (vi) 1-10 wt % of at least one of $Cu_2O$ and CuO.

In the aforementioned method, and others disclosed herein, the partial pressure of oxygen in the molten mass of the coloring frits according the invention is less than $10^{-9}$ atmospheres. In the aforementioned method, and others disclosed herein, the partial pressure of oxygen in the mass of molten colorless glass (that is being colored) has a partial pressure of oxygen in the range of $10^{-4}$ to $10^{-1}$ atmospheres, and preferably between $10^{-3}$ and $10^{-2}$ atmospheres.

Further embodiments of the invention include (a) copper containing (copper oxide) pigment; (b) copper cluster (islands of copper metal) containing pigment; (c) copper cluster containing pigment also including at least one of gold or silver; (d) a method of decorating a substrate such as glass, metal, ceramic, porcelain, bone china, glass ceramic, tiles or plastic using a red copper ruby glass as a pigment; (e) a method of decorating a substrate such as glass, metal, ceramic, porcelain, bone china, glass ceramic or tiles by screen-printing: direct and/or indirect (decal), spraying or digital printing; (f) a method of changing the color shade of a colored under layer which is white, yellow or blue or other colors. It is appreciated that copper oxide may be provided in the form of cuprous oxide ($Cu_2O$) and cupric oxide (CuO). Other copper salts and copper compounds like $CuSO_4$, $CuCO_3$ or $(CH_3CO_2)_2Cu$ could be also used.

The frits, pigments, enamels and other solids of the invention are free of lead, cadmium, bismuth, iron, selenium, arsenic, tantalum, chromium and sulfides. In various embodiments the frits, pigments, enamels and other solids may be (a) absolutely devoid of such metals, (b) free of intentional additions of such metals, and/or (c) contain only trace amounts, for example, less than 1 wt %, less than 0.5 wt %, less than 0.1 wt %, less than 0.01 wt %, and all values in between.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Enamel compositions of the invention include a glass frit portion, which in turn includes a combination of the oxides of silicon, at least one alkali-metal oxide, at least one alkaline-earth metal oxide, copper oxide, iron oxide, tin oxide, and boron oxide.

Alternatively, another embodiment of the invention involves enamel compositions of the invention include a glass frit portion, which in turn includes a combination of the oxides of silicon, at least one alkali-metal oxide, at least one alkaline-earth metal oxide, and tin oxide. The foregoing frit may be applied to a substrate, fired, and then coated with a blend of copper sulfate and sodium sulfate. The sulfate blend may be heated and annealed to effect copper ion exchange with the sodium in the earlier fired layer or into the substrate (if it is a sodium containing glass or enamel). Alternatively, copper nitrate may be used as a supply of copper ions, in which case the additional sodium (as supplied by sodium nitrate above) may not be necessary.

The components of the inventive compositions, articles and methods are detailed hereinbelow. Compositional percentages are by weight. Certain embodiments of the invention are envisioned where at least some percentages, temperatures, times, and ranges of other values are preceded by the modifier "about." "Comprising" is intended to provide support for "consisting of" and "consisting essentially of." Where the claims of this PCT application do not find explicit support in the specification, it is intended that such claims provide their own disclosure as support for claims or teachings in a later filed national application. All compositional percentages are by weight and are given for a blend prior to firing. Numerical ranges of oxides or other ingredients that are bounded by zero on the lower end (for example, 0-10 wt % SnO) are intended to provide support for the concept "up to [the upper limit]," for example "up to 10 wt % SnO" as well as a positive recitation that the ingredient in question is present in an amount that does not exceed the upper limit. An example of the latter is "comprises SnO, provided the amount does not exceed 10 wt %." A recitation such as "8-25 wt % ($Li_2O+Na_2O+K_2O$)" means that any or all of $Li_2O$, $Na_2O$ and/or $K_2O$ may be present in an amount of 8-25 wt % of the composition.

All ranges disclosed herein are to be understood to encompass the beginning and ending range values and any and all subranges therein. For example, a stated range of "1 to 10" should be considered to include any and all subranges between (and inclusive of) the minimum value of 1 and the maximum value of 10; that is, all subranges beginning with a minimum value of 1 or more and ending With a maximum value of 10 or less, e.g., 1.0 to 2.7, 3.3 to 8.9, 5.7 to 10, etc. Details on each ingredient follow.

Frit (Glass) Component. The principal glass and enamel compositions herein include. In particular, the invention provides an enamel composition comprising a solids portion comprising a fit portion, wherein the fit portion comprises, on weight percentages, the ranges of oxides presented in Table 1.

TABLE 1

| | Ranges of Oxides | | | | | | | |
|---|---|---|---|---|---|---|---|---|
| Formula | I | II | III | IV | V | VI | VII | VIII |
| Oxide | | | | | | | | |
| $SiO_2$ | 50-75 | 50-70 | 55-68 | 55-75 | 55-70 | 60-75 | 62-72 | 65-70 |
| ($R_2O$) | 4-22 | 8-20 | 10-17 | 8-22 | 10-20 | | | |
| $Na_2O$ | 0.3-18 | 3-15 | 5-12 | 9-20 | 10-18 | 8-20 | 12-18 | 14-18 |
| $K_2O$ | 2-10 | 4-8 | 4-8 | 2-13 | 4-10 | 8-20 | 12-18 | 14-18 |
| (R'O) | 0-30 | | | | | | | |
| CaO | 0-15 | 4-12 | 5-10 | 2-10 | 4-9 | 5-15 | 7-13 | 8-12 |
| MgO | 0-15 | 2-12 | 3-8 | 1-5 | 1.5-4 | | | |
| $B_2O_3$ | 0.5-20 | 5-15 | 7-14 | 9-17 | 11-15 | | | |
| $Al_2O_3$ | 0-15 | 1.5-12 | 2-10 | 0.1-3 | 0.5-2.5 | | | |
| SnO | 1-15 | 2-12 | | 1-15 | 2-13 | 1-15 | 3-12 | 5-10 |
| $Cu_2O$ | 1-10 | 2-4 | 2.5-4 | — | — | 0.1-5 | 0.5-3 | 1-2.5 |
| $SO_3$ | | | | | 0.05-1 | | | |
| Type | Red | Red | Red | Reducing | Reducing | Red | Red | Red |

When applied to and fired on a suitable substrate such as glass, enamel or metal, the inventive frits impart a red color thereto. For the reducing frits, (containing tin but no copper) such fit is applied to and fired on a substrate followed by application and annealing of a copper composition providing copper ions to exchange with sodium in the first fired fit. For example, a combination of copper sulfate and sodium sulfate may be applied to a previously fired reducing frit. It is envisioned that oxide ranges from different columns can be combined; the embodiments of invention are not limited to the oxides recited in one column.

The constituents in parentheses ($R_2O$) and (R'O) are generic formulas representing alkali metal oxides ($Na_2O$ and $K_2O$; also $Li_2O$ in some embodiments) and alkaline earth metal oxides (MgO, CaO, SrO, and BaO), respectively. An embodiment may be limited both by the amount of the generic formula or the amount of the specific formula or both. "Opt" means that in a broadest embodiment, the noted oxide is optional, meaning an independent claim covering the oxides of a column need not contain such optional oxide.

The invention envisions two main procedures to formulate and apply a pigment to a substrate which imparts a red color thereto.

In a first procedure, all oxides are blended and melted together at 900-1500° C. to form a clear melt that is quickly cooled to room temperature. Optionally in this first procedure an organic reducing agent such as sugar, potassium sodium tartrate or other organic reducing agent(s) may be blended and melted together to form the clear melt. Reducing sugars may contain an acetal group or a hemi-acetal group. Certain ketoses, those which tautomerize to aldoses, are reducing sugars. Reducing sugars include dextrose (glucose), maltose, sucrose, and certain glucopyranosides, for example. Carbon black as reducing agent is also possible. A red color is developed by annealing at 400-750° C. A variation hereon is to bypass cooling to room temperature, and instead cool from firing temperatures directly to annealing temperatures in the 400-750° C. range, thereby developing the red color. In either case, a red-colored frit is produced that can be used as a pigment. Such embodiments are found in columns I-III and VI-VII in Table 1.

In a second procedure, a tin-containing (reducing) fit (as in columns IV and V in Table 1) is smelted, fritted and fired to form a reducing glass. A copper sulfate/sodium sulfate paste is applied to the reducing glass and heated to 400-700° C. Copper ions diffuse into the reducing frit thereby imparting a red color thereto, forming a red frit that can be used as a pigment. Excess salts are washed away with water.

Following either of the two aforementioned procedures, the so-formed red pigment frit may be milled to any desired particle size between 0.1 to 100 microns, preferably 0.1-50 microns, more preferably 0.1-35 microns, still more preferably 0.1-20 microns, yet more preferably 0.1-10 microns, even more preferably 0.1-5 microns. In alternate embodiments, the $D_{90}$ size is 35 microns, preferably 20 microns, more preferably 10 microns and most preferably 5 microns. If the frit is used as a feeder frit, it may, but need not be, milled. If it is not milled, it may have particle sizes in the millimeter range.

The red pigment, which is really a glass frit, may be red or colorless, may be called a concentrate frit or feeder frit, may be applied directly to a substrate absent a carrier frit, or may be used in conjunction with another fit. This other fit may be non-colored, to adjust the intensity of the color so imparted. Also the chemical resistance and thermal expansion coefficient could be impacted by such a frit. It is also possible to change the transparency by using an opaque frit and to change the color shade by using a colored frit. Application of the pigment to a substrate is facilitated by use of a medium, which includes a binder and a solvent to disperse and wet the pigment, and ensure homogeneous coating of the pigment on the substrate prior to firing.

If colors other than red are desired, or minor alterations to the red colors obtained by the inventive frits and pigments are desired, additional oxides can be added to any embodiment herein, singly, or in any combination, up to the noted weight percentage: $Cs_2O$: 2%; $Ag_2O$: 5%; MgO: 5%; $CeO_2$: 5%; MnO: 10%; NiO 5%; $P_2O_5$: 5%; $V_2O_5$: 10%; $La_2O_3$: 5%; $Pr_2O_3$: 5%; $In_2O_3$: 5%; $Cr_2O_3$: 5%; $Sb_2O_3$: 5%, CoO: 5%; $Nb_2O_5$: 4%; $WO_3$: 4%; and $MoO_3$: 4%. Generally, Mn gives a brown color, Ni and Cr each give green colors, and Co gives a blue color.

As can be seen above, the composition of the glass frits useful in this invention can be adapted over a broad range of oxide compositions. Glasses may be formulated according to the principal glass and enamel compositions above, together with, optionally one or more secondary or additional oxides. The glass and enamel compositions herein typically contain low amounts of metals such as chromium, iron, lead, cadmium, bismuth, selenium, arsenic, tantalum, and sulfides. Preferably, the glass compositions herein contain less than 5 wt % of each of chromium, iron, lead, cadmium, bismuth, selenium, arsenic, tantalum, and sulfides and more preferably, less than 1 wt % of each. Still more preferably, less than 0.5 wt % of each is present, and even more preferably, less than 0.1 wt % of each is present. Most preferably, the glass and enamel compositions herein are substantially free of, or devoid the aforementioned metals or their oxides. It is recognized that constraints of commerce sometimes limit the purity of metal or oxide constituents used in smelting a glass frit. Hence, embodiments of the invention include those frit compositions where each or all of the metals are not intentionally added. Still more preferably, the glass frit compositions herein and the enamels made therefrom are absolutely devoid of chromium, iron, lead, cadmium, bismuth, selenium, arsenic, and tantalum, as well as sulfides in any form.

Broadly, the glass frits and enamels useful herein have melting points in the range of about 1000° F. to 1400° F. (about 540° C. to about 760° C.), or any intermediate temperature such as 1030° F., 1040° F., 1050° F., 1060° F., 1080° F., 1110° F., 1150° F., 1190° F., 1200° F., 1210° F., 1250° F., 1275° F., 1300° F., 1325° F., 1350° F., and 1375° F., and various of the frits may be effectively fired at those temperatures. Preferably, the glass frits herein can be fired at 1000-1250° F., more preferably at 1020-1200° F., still more preferably at about 1030-1150° F., and most preferably at about 1040-1100° F. Container glass is typically not fired above 1200° F. (650° C.).

Generally, the glass frits are formed in a known manner, for example, blending the starting materials (oxides, salts) and melting together at a temperature of about 1000 to about 1400° C. (about 1830 to about 2550° F.) for about 45 minutes to about several hours to form a molten glass having the desired composition. The molten glass formed can then be suddenly cooled in a known manner (e.g., water quenched) to form a frit. The frit can then be ground using conventional milling techniques to a fine particle size as desired.

Standard fits or fluxes can be used to dilute the inventive fits and pigments, for example transparent fluxes sold under the Samba® trademark. As Samba® 10-1600, 10-1650 and 10-1641, with softening points of 640, 660 and 680° C., respectively. Ferro Frits from the NPR system, lead-free glass enamels suitable for tableware, including NPR 820, which is a non-colored flux, may also be used. The Samba® and NPR system fits noted herein are commercially available from Ferro Corporation, Cleveland, Ohio, United States.

Crystalline Material.

Crystalline materials may, but need not, be included along with the frit compositions herein to promote crystallization (i.e., crystallization seeds). Crystalline materials useful herein include zinc silicates, zinc borates, zinc titanates, silicon zirconates, aluminum silicates, calcium silicates, and combinations thereof. The crystalline materials may include, without limitation, $Zn_2SiO_4$, $2ZnO•3TiO_2$, $ZnTiO_3$, $ZnO•B_2O_3$, $3ZnO•B_2O_3$, $5ZnO•2B_2O_3$, and $Al_2SiO_5$. The commonly owned Rüderer, U.S. Pat. No. 5,153,150 and Sakoske, U.S. Pat. No. 5,714,420 patents provide further information on crystalline materials. Preferred crystalline materials include zinc silicates such as $Zn_2SiO_4$ and zinc borosilicates such as $ZnO•B_2O_3$. Specific examples of seed materials used herein include product numbers 2077 (bismuth silicate seed material) and 2099 (zinc silicate seed material) manufactured by Ferro Glass and Color Corporation of Washington, Pa. The enamels herein may optionally include 0.1-15 wt %, preferably about 0.5-10 wt %, and more preferably 1-5 wt % of at least one crystalline material.

Decoration and Glass Forming.

A glass substrate may be colored or decorated by applying any enamel composition described herein to at least a portion of a substrate, for example, a glass substrate such as a glass sheet, automotive glass, (i.e., windshield), architectural glass, dinnerware, household appliance panels, beverage containers, tumblers, and bottles. An enamel composition may, but need not, be applied in the form of a paste as disclosed herein.

In particular, the invention involves a method of decorating a glass substrate comprising: (a) applying to the substrate a coating of an enamel composition comprising a solids portion, comprising a frit portion comprising, prior to firing: prior to firing: (i) 60-75 wt % $SiO_2$, (ii) 8-25 wt % ($Li_2O$+$Na_2O$+$K_2O$), (iii) 1-15 wt % SnO, (iv) 5-15 wt % CaO, (v)

2-10 wt % MgO (vi) 0.1-2 wt % $Fe_2O_3$, 0.1-2 wt % $Cu_2O$ and 0.1 wt % $SO_3$ and (b) firing the substrate and coating at a temperature sufficient to flow the enamel composition to cause the enamel composition to adhere to the substrate.

The enamel composition may be applied to the entire surface of a substrate, or to only a portion thereof, for example the periphery, or a portion corresponding to another desired decorative pattern.

The method may include a glass forming step whereby the glass substrate is heated to an elevated temperature and subjected to a forming pressure to bend the glass substrate. In particular, bending the glass substrate may involve heating the glass substrate to which has been applied the to an elevated temperature, of, for example, at least about 570° C., at least about 600° C., at least about 625° C., or at least about 650° C. Upon heating, the glass is subjected to a forming pressure, e.g., gravity sag or press bending in the range of 0.1 to 5 psi, or 1-4 psi, or typically about 2-3 psi, with a forming die.

One or more alternate glass forming steps to form beverage containers, tumblers, dinnerware and other glass articles may be included in the methods herein.

The following paragraphs relate to ingredients that facilitate handling and application of the inventive glasses and pigments.

Organic Vehicle.

When applied by procedures requiring one, such as screen printing, the solid ingredients herein may be combined with an organic vehicle, or medium, to form a paste. The paste in general contains 60-90 wt % solids, preferably 65-85%, more preferably 70-80 wt %, as above described and 10-40% of an organic vehicle, preferably 15-35%, more preferably 20-30%. The viscosity of the paste is adjusted so that it can be screen-printed, roll coated, sprayed, or otherwise applied in a desired manner onto the desired substrate. Paste ratios may fall in the ranges of about 1.4:1 to 5:1, or about 2:1 to 4.4:1.

Useful organic vehicles include Ferro Corporation 80 1022, which is a water-soluble medium displaying optimum combustibility and depolymerization, suitable for all decorative, direct screen printing applications on glass, enamel; ceramics and porcelain. It is also suitable for printing relief decors. Working viscosity for screen printing is recommended to be 8.0-12.0 Pa*s (20° C., D=200 l/s, plate-cone-system), while that for roller coating is recommended to be a working viscosity of 90-110 sec. (23° C., 6 mm DIN Cup).

The organic vehicle comprises a binder and a solvent, which are selected based on the intended application. It is essential that the vehicle adequately suspend the particulates (i.e., frit, pigment, crystalline material) and burn off completely upon firing. In particular, binders including methyl cellulose, ethyl cellulose, and hydroxypropyl cellulose, and combinations thereof, may be used. Suitable solvents include propylene glycol, diethylene glycol butyl ether; 2,2,4-trimethyl pentanediol monoisobutyrate (Texanol™); alpha-terpineol; beta-terpineol; gamma terpineol; tridecyl alcohol; diethylene glycol ethyl ether (Carbitol™), diethylene glycol butyl ether (Butyl Carbitol™); pine oils, vegetable oils, mineral oils, low molecular weight petroleum fractions, tridecyl alcohols, and synthetic or natural resins and blends thereof. Surfactants and/or other film forming modifiers can also be included. The solvent and binder may be present in a weight ratio of about 50:1 to about 20:1.

In general, the enamel pastes are viscous in nature, with the viscosity depending upon the application method to be employed and end use. For purposes of screen-printing, viscosities ranging from 10,000 to 80,000, preferably 15,000 to 35,000 centipoise, and more preferably 18,000 to 28,000 centipoise at 20° C., as determined on a Brookfield Viscometer, #29 spindle at 10 rpm, are appropriate.

Dispersing Surfactant.

A dispersing surfactant assists in pigment wetting, when an insoluble particulate inorganic pigment is used. A dispersing surfactant typically contains a block copolymer with pigment affinic groups. For example, surfactants sold under the Disperbyk® and Byk® trademarks by Byk Chemie of Wesel, Germany, such as Disperbyk 162 and 163, which are solutions of high molecular weight block copolymers with pigment affinic groups, and a blend of solvents (xylene, butylacetate and methoxypropylacetate). Disperbyk 162 has these solvents in a 3/1/1 ratio, while the ratio in Disperbyk 163 is 4/2/5. Disperbyk 140 is a solution of alkyl-ammonium salt of an acidic polymer in a methoxypropylacetate solvent.

Rheological Modifier.

A rheological modifier is used to adjust the viscosity of the green pigment package composition. A variety of rheological modifiers may be used, including those sold under the Byk®, Disperplast®, and Viscobyk® trademarks, available from Byk Chemie. They include, for example, the BYK 400 series, such as BYK 411 and BYK 420, (modified urea solutions); the BYK W-900 series, (pigment wetting and dispersing additives); the Disperplast® series, (pigment wetting and dispersing additives for plastisols and organosols); and the Viscobyk® series, (viscosity depressants for plastisols and organosols).

Flow Aid.

A flow aid is an additive used to control the viscosity and rheology of a pigment or paste composition, which affects the flow properties of liquid systems in a controlled and predictable way. Rheology modifiers are generally considered as being either pseudoplastic or thixotropic in nature. Suitable surfactants herein include those sold commercially under the Additol®, Multiflow®, and Modaflow® trademarks by UCB Surface Specialties of Smyrna, Ga. For example, Additol VXW 6388, Additol VXW 6360, Additol VXL 4930, Additol XL 425, Additol XW 395, Modaflow AQ 3000, Modaflow AQ 3025, Modaflow Resin, and Multiflow Resin.

Adhesion Promoter.

Adhesion promoting polymers are used to improve the compatibility between a polymer and a filler. Suitable adhesion promoters include those sold by GE Silicones of Wilton, Conn. under the Silquest®, CoatOSil®, NXT®, XL-Pearl™ and Silcat® trademarks. Examples include the following product numbers, sold under the Silquest® trademark: A1101, A1102, A1126, A1128, A1130, A1230, A1310, A162, A174, A178, A187, A2120. For example, Silquest® A-187 is (3-glycidoxypropyl) trimethoxysilane, which is an epoxysilane adhesion promoter. Silanes sold by Degussa AG of Düsseldorf, Germany, under the Dynasylan® trademark are also suitable.

Stabilizers.

Light or UV stabilizers are classified according to their mode of action: UV blockers—that act by shielding the polymer from ultraviolet light; or hindered amine light stabilizers (HALS)—that act by scavenging the radical intermediates formed in the photo-oxidation process. The compositions of the invention may, when advantageous, comprise about 0.1 to about 2 wt % of a light stabilizer, preferably about 0.5 to about 1.5%, and further comprise about 0.1 to about 4 wt % of a UV blocker, preferably about 1 to about 3%.

Light stabilizers and UV blockers sold under the Irgafos®, Irganox®, Irgastab®, Uvitex®, and Tinuvin® trademarks by from Ciba Specialty Chemicals, Tarrytown, N.Y., may be used, including product numbers 292 HP, 384-2, 400, 405, 411L, 5050, 5055, 5060, 5011, all using the Tinuvin trademark. Suitable UV blocking agents include Norbloc® 7966 (2-(2' hydroxy-5' methacryloxyethylphenyl)-2H-benzotriazole); Tinuvin 123 (bis-(2,2,6,6-tetramethyl-1-(octyloxy)-4-piperidinyl) ester); Tinuvin 99 (3-(2H-benzotriazole-2-yl) 5-(1,1-dimethyl ethyl)-4-hydroxybenzenepropanoic acid, C7-9-branched alkyl esters) Tinuvin 171 (2-(2H-benzotriazol-2-yl)-6-dodecyl-4-methyl-phenol). Products sold under the Norbloc® trademark are available from Janssen Pharmaceutica of Beerse, Belgium.

Suitable hindered amine light stabilizers (HALS) are sold by the Clariant Corporation, Charlotte, N.C., under the Hostavin® trademark, including Hostavin 845, Hostavin N20, Hostavin N24, Hostavin N30, Hostavin N391, Hostavin PR31, Hostavin ARO8, and Hostavin PR25. HALS are extremely efficient stabilizers against light-induced degradation of most polymers. They do not absorb UV radiation, but act to inhibit degradation of the polymer, thus extending its durability. Significant levels of stabilization are achieved at relatively low concentrations. The high efficiency and longevity of HALS are due to a cyclic process wherein the HALS are regenerated rather than consumed during the stabilization process. They also protect polymers from thermal degradation and can be used as thermal stabilizers The inventive materials are cadmium-free red pigments that can be made by conventional glass and pigment processing. The pigment can be used to decorate glass ceramic metal substrates and as colorant in paints and thermoplastic processing. The copper coatings and pigments can be useful as UV blockers.

EXAMPLES

The following compositions represent exemplary embodiments of the invention. They are presented to explain the invention in more detail, and do not limit the invention.

TABLE 2

Example 1. Tin-reducing frit formulations in wt %

| Oxide | Frit F | Frit G |
|---|---|---|
| $SiO_2$ | 70.36 | 65.75 |
| CaO | 8.53 | 7.96 |
| $Fe_2O_3$ | 0.48 | 0.45 |
| MgO | 3.68 | 3.43 |
| SnO | 6.59 | 12.72 |
| $Na_2O$ | 10.23 | 9.56 |
| $SO_3$ | 0.15 | 0.14 |

A reducing frit is pasted together with copper nitrate as follows (133B). One gram of Frit G and 1 g $Cu(NO_3)_2$ in DPG were weighed onto a pane of auto glass. The components were mulled together with a spatula. The paste was spread out on the surface of the glass, and the glass was dried on a hotplate. After drying, the panes were placed in a kiln set at 1120° F. and heated for four minutes. No red color was evident. The panes were moved to another kiln and the temperature was raised to 1250° F. The powder on the panes began to show more red value after heating for a few minutes at 1250° F., so the panes were left at this temperature for 20 minutes. The panes were removed and cooled. The powder had an adobe color that is blue/dirty and weak compared to cadmium colors, but the red was identifiable.

When the samples were examined under the microscope, it appeared that not all of the glass particles were colored. This suggested that a more intense color could be possible. The following sample was made: (133D) from 0.5 g 133B, 0.6 g $Cu(NO_3)_2$ in DPG, and 0.24 g 85% $H_3PO_4$.

The ingredients were mulled together on a glass pane with a spatula. The panes were placed on a hotplate and dried. The powder was loosened from the surface with a spatula. The panes were fired at 1250° F. After 10 minutes, the color of the two powders was quite brown, but this observation was made while the powders were still hot. The two panes were left in the kiln and the power was shut off. The two samples were left to cool until the morning. Upon cooling, the red value of both of these samples was increased. These two samples are darker in color than their parent samples. Of these two samples, 133D is a more saturated color. Under microscopic examination, there were some colorless particles in this sample, but 99% or more of the material exhibited a red color.

TABLE 3

Exemplary Frit formulations in wt %.

| Formula Oxide | Frit A | Frit B | Frit C | Frit D | Frit E | Frit F | Frit G | Frit H |
|---|---|---|---|---|---|---|---|---|
| $SiO_2$ | 65.38 | 59.58 | 54.56 | 51.49 | 55.13 | 70.36 | 65.75 | 66.33 |
| $Na_2O$ | 9.56 | 9.07 | 17.68 | 0.42 | 17.87 | 10.23 | 9.56 | 10.27 |
| $K_2O$ | 5.83 | 7.88 | 2.16 | 4.41 | 2.19 | — | — | 9.05 |
| CaO | 9.31 | 8.49 | 3.76 | 8.99 | 3.80 | 8.52 | 7.96 | 9.46 |
| MgO | — | — | 3.25 | — | 3.28 | 3.68 | 3.43 | — |
| $B_2O_3$ | 0.85 | 0.78 | 13.64 | 16.32 | 13.78 | — | — | 0.88 |
| $Al_2O_3$ | 3.16 | — | 1.95 | 12.00 | 1.97 | — | — | — |
| SnO | 3.75 | 6.90 | 1.98 | 3.56 | 1.97 | 6.59 | 12.72 | 1.96 |
| $Cu_2O$ | 2.97 | 7.32 | 1.03 | 2.81 | — | — | — | 2.05 |
| $SO_3$ | — | — | — | — | — | 0.15 | 0.14 | — |
| $Fe_2O_3$ | — | — | — | — | — | 0.48 | — | — |
| Reducing agent* | yes | yes | yes | yes | yes | | | yes |

*A reducing agent such as a sugar or potassium sodium tartrate is used in the range of 0.5-20 wt %.

Example 2

The ingredients of Frit B were melted at 1400° C. for 1 hour. After a fast cool-down to room temperature the fit was annealed at 550° C. until a dark red color was achieved. The frit was milled ($D_{90}$<16 microns).

Example 3

The ingredients of Frit C were melted at 1100° C. for 1 hour. After a fast cooling down to room temperature the fit was annealed at 550° C. until a dark red color was achieved. The frit was milled ($D_{90}$<16 microns).

Example 4

The ingredients of Frit D were melted at 1400° C. for 1 hour. After a fast cooling down to room temperature the frit was annealed at 550° C. until a dark red color was achieved. The frit was milled ($D_{90}$<50 microns).

Example 5

Ingredients of Frit E were melted at 1000° C. for 1 hour. After a fast cooling down to room temperature. The fit was milled ($D_{90}$<50 microns).

Example 6

Making a red pigment with a reducing flux. The following ingredients were mixed: 49.51 grams of the product of Example 5, 12.62 grams of $CuSO_4$, and 37.87 grams of $Na_2SO_4$. The mixture was annealed for 135 minutes at 550° C., washed with hot water and filtered. The red pigment was milled to a $D_{90}$<16 microns.

Example 7

Example 6 was mixed with media and sprayed onto a steel plate which was colored before with white enamel. The steel plate was dried and then fired for 10 min at 700° C. An ox-blood-red color was obtained on the steel plate.

Example 8

Frit B was mixed with a fit (Ferro NPR 820) at a 1:1 weight ratio and pasted with media (Ferro 80 1022) at a 10:7 weight ratio and screen-printed (48 mesh) on glass. The glass was fired at 650° C. for 10 min. after firing, the glass samples showed a red color.

Example 9

The ingredients of Frit H were melted at 1400° C. and cooled to room temperature by quenching with water. The frit was heated two hours at 550° C. and formed a dark red colored glass, useful as a pigment. The glass/pigment was milled in a ball mill. The milled pigment was mixed with a frit, Ferro NPR 820 at a 1:1 weight ratio. A screen printing medium (Ferro 801022) at a 10:7 weight ratio (frit:medium) was mixed therewith, to form a paste, which was printed on glass, and fired 10 minutes at 640° C., the heating rate being 14K/minute. A red decorated glass was obtained.

Example 10

The ingredients of Frit A were melted at 1400° C. for 1 hour. After a fast cooling down to room temperature the frit was annealed at 550° C. until a dark red color was achieved. The fit was milled to a $D_{90}$<16 microns.

Example 11

The product of Example 10 was mixed with flux 10 1650 (Ferro) in a weight ratio of 1:2 and pasted with media 80 820 (Ferro) in a weight ratio of 1:1, printed on porcelain and fired for 10 min at 820° C., the heating rate being 7K/minute. An ox-blood-red color was obtained on the porcelain.

Additional advantages and modifications will readily occur to those skilled in the art. Therefore, the invention in its broader aspects is not limited to the specific details and illustrative example shown and described herein. Accordingly, various modifications may be made without departing from the spirit or scope of the general invention concept as defined by the appended claims and their equivalents.

The invention claimed is:

1. A fired enamel composition that is free of lead, cadmium, bismuth, iron, selenium, arsenic, tantalum, chromium and sulfides, the composition comprising a solids portion comprising a frit portion, wherein the frit portion comprises, prior to firing:
   a. 55-75 wt % $SiO_2$,
   b. 4-22 wt % $R_2O$, wherein R is at least one of Na and K,
   c. 2-30 wt % R'O, wherein R' is at least one of Mg, Ca, Sr, and Ba,
   d. 0.1-3 wt % $Al_2O_3$, and
   e. 1-15 wt % SnO
   and at least one of
      i. 0.05-1 wt % $SO_3$ and
      ii. 9-17 wt % $B_2O_3$.

2. The composition of claim 1, wherein $R_2O$ comprises 8-20 wt % $Na_2O$ and sufficient $K_2O$ to bring the total $Na_2O+K_2O$ to 9-22 wt %.

3. A method of making a red pigment composition comprising
   a. smelting a reducing glass by heating a mixture of compounds, the mixture comprising:
      i. 55-75 wt % $SiO_2$,
      ii. 4-22 wt % $R_2O$, wherein R is at least one of Na and K,
      iii. 2-30 wt % R'O, wherein R Ins at least one of Mg, Ca, Sr, and Ba,
      iv. 0.1-3 wt % $Al_2O_3$, and
      v. 1-15 wt % SnO
      and at least one of
         1. 0.05-1 wt % $SO_3$ and
         2. 9-17 wt % $B_2O_3$,
   b. cooling the glass,
   c. reducing the glass to a frit having a desired particle size by mechanical grinding or milling,
   d. applying to the glass frit a copper source comprising a copper compound capable of exchanging copper ions with the glass frit, and
   e. annealing the glass fit with the copper source to effect exchange of copper ions for ions present in the glass to impart a red color thereto.

4. The method of claim 3, wherein the copper source is selected from the group consisting of (a) copper nitrate and (b) copper sulfate, and combinations thereof.

5. The method of claim 3, wherein the copper source includes copper sulfate and sodium sulfate.

6. A method of decorating a glass substrate, ceramic substrate or metal substrate comprising:
   a. applying to a glass substrate, ceramic substrate or metal substrate an enamel composition that contains less than 5 wt % of each of lead, cadmium, bismuth, iron, selenium, arsenic, tantalum, chromium and sulfides, the composition comprising a solids portion, wherein the solids portion comprises a frit portion, wherein the fit portion consists of, prior to firing:
      i. 50-75 wt % $SiO_2$,
      ii. 4-22 wt % $R_2O$, wherein R is at least one of Na and K,
      iii. 2-30 wt % R'O, wherein R' is at least one of Mg, Ca, Sr and Ba,
      iv. 0.5-20 wt % $B_2O_3$,
      v. 0-15 wt % $Al_2O_3$,
      vi. 1-15 wt % SnO, and
      vii. 1-10 wt % of at least one of $Cu_2O$ and CuO, and
   b. firing the substrate and enamel composition at a temperature sufficient to flow the enamel composition to cause the enamel composition to at least partially adhere to the substrate.

7. A method of decorating a glass substrate, ceramic substrate or metal substrate by a decal comprising:
   a. applying to a decal paper an enamel composition that contains less than 5 wt % of lead, cadmium, bismuth, iron, selenium, arsenic, tantalum, chromium and sulfides, the composition comprising a solids portion, wherein the solids portion comprises a frit portion, wherein the frit portion consists of, prior to firing:
      i. 50-75 wt % $SiO_2$,
      ii. 4-22 wt % $R_2O$, wherein R is at least one of Na and K,
      iii. 2-30 wt % R'O, wherein R' is at least one of Ca and Mg,
      iv. 0.5-20 wt % $B_2O_3$,
      v. 0-15 wt % $Al_2O_3$,
      vi. 1-15 wt % SnO, and
      vii. 1-10 wt % $Cu_2O$, b. applying a cover coat on the enamel composition to create a decal, c. applying the decal on the substrate, which could be glass, ceramic or metal, and d. firing the substrate and decal at a temperature sufficient to flow the enamel composition to cause the enamel composition to at least partially adhere to the substrate.

* * * * *